United States Patent [19]
Watanabe et al.

[11] Patent Number: 5,541,021
[45] Date of Patent: Jul. 30, 1996

[54] ALKALINE CELL

[75] Inventors: Mitsutoshi Watanabe, Ibaraki; Hiroshi Ishiuchi, Settsu, both of Japan

[73] Assignee: Hitachi Maxell, Ltd., Osaka-fu, Japan

[21] Appl. No.: 380,158

[22] Filed: Jan. 30, 1995

Related U.S. Application Data

[63] Continuation of Ser. No. 112,458, Aug. 27, 1993, abandoned.

[30] Foreign Application Priority Data

Aug. 31, 1992 [JP] Japan .................................. 4-257338

[51] Int. Cl.⁶ ...................................................... H07M 4/42
[52] U.S. Cl. ........................... 429/206; 429/229; 429/231
[58] Field of Search ................................. 429/5, 206, 229, 429/231

[56] References Cited

U.S. PATENT DOCUMENTS

| | | | |
|---|---|---|---|
| 2,959,631 | 11/1960 | Boswell | 429/206 |
| 4,327,157 | 4/1982 | Himy et al. | 429/229 X |
| 5,108,494 | 4/1992 | Uemura et al. | 429/206 X |
| 5,240,793 | 8/1993 | Glaeser | 429/206 |

OTHER PUBLICATIONS

"Atarashii Denchi (New Cells)", published by Publishing Department of Tokyo Denki University (1978), p. 42). (month unknown).

*Primary Examiner*—Stephen Kalafut
*Attorney, Agent, or Firm*—Birch, Stewart, Kolasch & Birch, LLP

[57] ABSTRACT

There is provided an alkaline cell without mercury comprising zinc as a negative electrode active material and an electrolytic solution characterized in that a bismuth compound is added to the electrolytic solution.

4 Claims, 1 Drawing Sheet

ALKALINE CELL

This application is a continuation of application Ser. No. 08/112,458 filed on Aug. 27, 1993, now abandoned.

BACKGROUND OF THE INVENTION

1. Field of the Invention

The present invention relates to an alkaline cell which comprises a negative electrode active material of zinc, which does not contain mercury (namely, a so-called "mercury-less cell"). Particularly, the present invention relates to an alkaline cell in which generation of hydrogen gas due to the presence of impurities in the cell, such as iron and nickel materials, is suppressed.

2. Description of the Related Art

In order to suppress generation of hydrogen gas due to corrosion of zinc within an alkaline cell in which zinc is used as the negative electrode active material, surfaces of particles made of zinc have been, hitherto, amalgamated with mercury. An amalgamation ratio as much as near 10% by weight based on the amalgamated zinc has been used so as to sufficiently suppress the corrosion of zinc. (See, for example, "Atarashii Denchi (New Cells)" published by Publishing Department of Tokyo Denki University (1978), p. 42).

However, environmental pollution due to the mercury of the cell has been emphasized nowadays and it has been required to reduce the amalgamation ratio.

Therefore, indium, lead, gallium, aluminum, bismuth and so on have been added to zinc instead of mercury to make an alloy with zinc so as to suppress the corrosion of zinc. Thus, the amalgamation ratio has been highly reduced. Therefore it is now required to use a cell without mercury (a "mercury-less cell").

The inventors have made studies on the cell without mercury, and found that the generation of hydrogen gas due to impurities contained in the cell is rapidly accelerated in the cell without mercury, which impurities have been of particular interest up to now.

That is, iron, nickel, chromium, an alkali metal, aluminum and so on are included as impurities in materials constituting the alkaline cell excluding an electrolytic solution. When zinc powder is put into and then mixed with the electrolytic solution containing such impurities, the following corrosion reactions of zinc are promoted, and thus the generation of hydrogen gas is also promoted:

(On anode side) 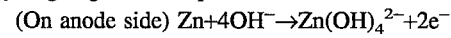

(On cathode side) 

The impurities contained in the electrolytic solution originate from impurities contained in the potassium hydroxide for the preparation of the electrolytic solution and also from impurities contained in the cell constituting materials, in example the negative electrode material. It is impossible to completely exclude small amounts of such impurities contained in these materials when the cell is produced.

In the conventional cell, even when such impurities are contained, the generation of hydrogen gas is suppressed with the presence of mercury so that almost no problems occur. In conjunction with the "mercury-less cell", the problem of the rapid generation of hydrogen gas due to the presence of the impurities has been emphasized.

SUMMARY OF THE INVENTION

It is therefore, an object of the present invention to overcome the problem accompanied with the "mercury-less cell" as described above, and to provide an alkaline cell in which generation of hydrogen gas due to small amounts of impurities contained in the cell is suppressed.

According to the present invention, there is provided an alkaline cell comprising zinc as a negative electrode active material in which at least one bismuth compound is added to the electrolytic solution.

DETAILED DESCRIPTION OF THE INVENTION

Figure 1:
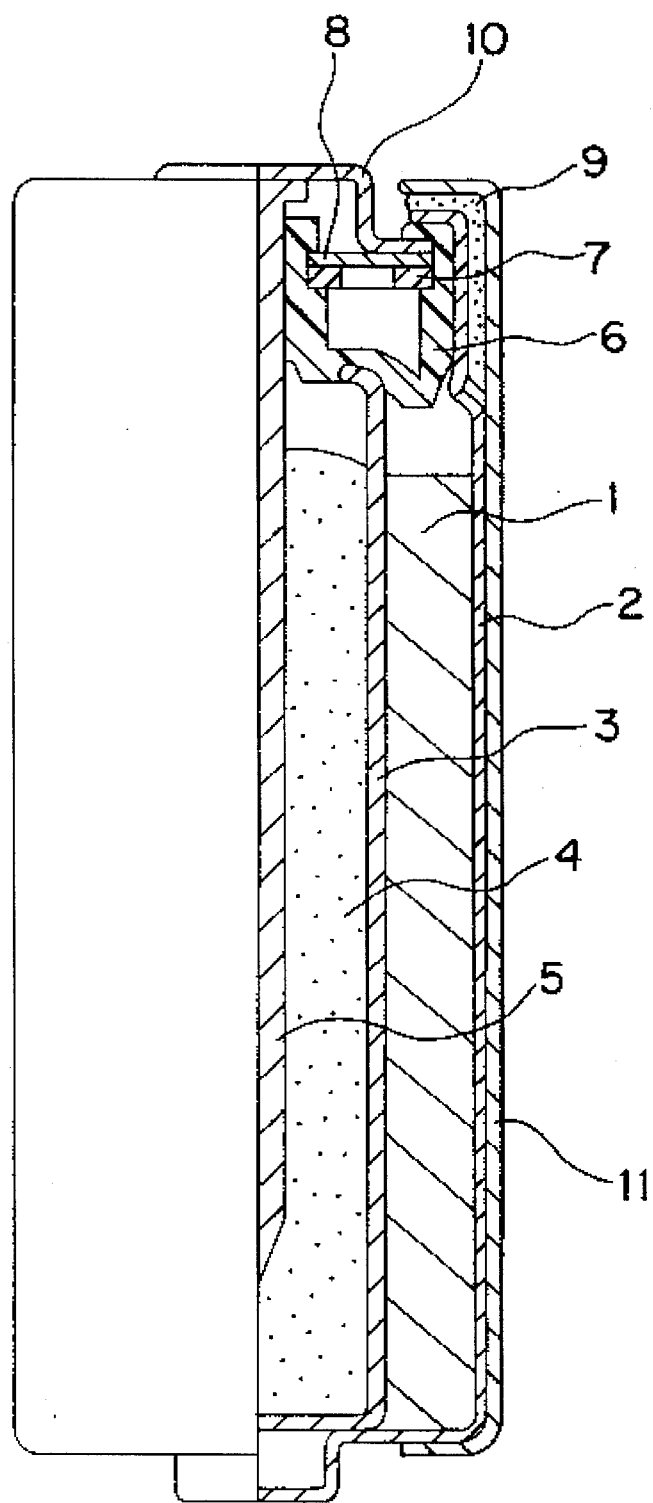
FIG. 1 schematically shows a partial sectional view of an alkaline cell according to the present invention.

Why hydrogen gas is generated in the presence of the small amount of the impurities has not been clearly understood. Not bound by any theory, the inventors contemplate as follows:

When the bismuth compound, for example bismuth oxide or bismuth hydroxide, is added into the electrolytic solution, only a small amount of the bismuth compound is dissolved and the rest of the bismuth compound is dispersed in the electrolytic solution since only a small amount of the bismuth compound is soluble in a concentrated alkali solution as the electrolytic solution. Then, when zinc powder as the negative electrode active material is added to the electrolytic solution in which the bismuth compound has been already dispersed, dissolved bismuth ion-exchanges with zinc so that a large amount of bismuth is likely to be present on particle surfaces of the zinc powder. To the contrary, in the case in which zinc has been alloyed beforehand with bismuth, as in the prior art, bismuth can invade the inside of the particles of the zinc powder so that a large amount of bismuth is not necessarily positioned on the surfaces of the zinc particles.

Generally, bismuth can be alloyed with various kinds of metals, for example, nickel, an alkali metal, aluminum, antimony, copper, tin, thallium and so on, which may be present in the electrolytic solution as the impurities. Namely, bismuth captures such various metals present as the impurities in the electrolytic solution so that the corrosion of zinc is suppressed and thus the generation of hydrogen gas is reduced. In addition, bismuth forms a solid solution with indium and thus co-use of an indium compound with the bismuth compound further increases the effect to suppress the generation of hydrogen gas based on the bismuth compound.

Examples of the bismuth compounds to be added to the electrolytic solution are bismuth oxide ($Bi_2O_3$), bismuth hydroxide ($Bi_2(OH)_3$), bismuth chloride ($BiCl_3$), bismuth nitrate ($Bi(NO_3)_3$), bismuth carbonate ($Bi_2(CO_3)_3$) and so on. Among them, bismuth oxide and bismuth hydroxide are the most preferable to be used.

An amount of the bismuth compound, when expressed as an amount of $Bi_2O_3$ or $Bi_2(OH)_3$, to be added to the electrolytic solution is preferably in a range of 5 ppm to 1% by weight, and more preferably in a range of 50 to 1000 ppm based on the weight of the zinc contained as the negative electrode active material. When the amount of the bismuth compound added to the electrolytic solution is less than 5 ppm by weight, the effect to suppress the hydrogen gas generation is not sufficient. When the amount is greater than 1% by weight, the surfaces of the zinc particles become so reactive that the suppression effect of the hydrogen gas generation is reduced.

An indium compound can further be added to the electrolytic solution to further suppress hydrogen gas generation. Examples of the indium compound are indium oxide ($In_2O_3$), indium hydroxide ($In(OH)_3$), indium chloride ($InCl_3$), indium sulfate ($In_2(SO_4)_3$), indium carbonate ($In_2(CO_3)_3$) and so on. Among them, indium oxide and indium hydroxide are the most preferable to be used.

The indium compound can promote the suppression effect of the hydrogen gas generation based on the bismuth compound as described above. An amount of the indium compound, when expressed as an amount of $In_2O_3$ or $In_2(OH)_3$ to be added into the electrolytic solution is preferably in a range of 5 ppm to 1% by weight, more preferably in a range of 50 to 1000 ppm by weight based on zinc contained as the negative electrode active material.

The present invention resides in the addition of the bismuth compound or the addition of the bismuth compound and also the indium compound into the electrolytic solution. Except for the addition of the bismuth compound and the optional indium compound, any conventional constitutional feature of the conventional alkaline cell can be employed in the present invention.

For example, as the negative electrode active material, zinc itself as well as zinc in combination with indium, lead, gallium, aluminum and/or bismuth may be used. As a positive electrode active material, for example, manganese dioxide may be used. As the electrolyte solution, an aqueous solution containing an alkali, such as a potassium hydroxide aqueous solution or a sodium hydroxide aqueous solution, may be used. Also, it is possible to add zinc oxide into the electrolytic solution.

PREFERRED EMBODIMENTS

The present invention will be, hereinafter, described in detail with reference to the following Examples. Before Examples are described, apart from an application to a practical cell, results of experiments will be explained in which the suppression effect of the hydrogen gas generation was examined when first a bismuth compound and an indium composition, and then zinc powder was added to the electrolytic solution.

EXPERIMENT 1

Two electrolytic solutions (electrolytic solution A and electrolytic solution B) were prepared from an aqueous solution containing 35% by weight of potassium hydroxide which had been saturated with zinc oxide by adding a given amount of iron and nickel as impurities so that impurity contents of the solutions were different each other as shown in below Table 1:

TABLE 1

| | Impurity Content in Electrolytic Solution | |
|---|---|---|
| Impurity | Electrolytic Solution A | Electrolytic Solution B |
| Iron | 0.6 ppm | 1.5 ppm |
| Nickel | 0.5 ppm | 1.0 ppm |

The reason why two solutions having different contents of the impurities were prepared is to observe the effect of the impurity contents on the hydrogen gas generation. Also, the reason why a practical cell system was not employed is to exclude any other effect provided by other factors except the impurities.

A predetermined amount of bismuth oxide ($Bi_2O_3$) and/or indium oxide ($In_2O_3$) in the form of powder was added in each electrolytic solution, and then the zinc powder of which particles had a particle size distribution in a range of 75 to 450 µm was immersed in the electrolytic solution for 7 days at a temperature of 45° C. An amount of hydrogen gas generated during the immersion was measured.

For each kind of the electrolytic solution, four electrolytic solutions were prepared each of which contained a different impurity level, namely, i) 100 ppm of bismuth oxide ($Bi_2O_3$); ii) 100 ppm of indium oxide ($In_2O_3$); iii) 100 ppm bismuth oxide ($Bi_2O_3$) and 100 ppm of indium oxide ($In_2O_3$); and iv) no addition, each on the basis of the weight of zinc contained as the negative electrode active material.

As the zinc, two kinds of zinc powder were used; one zinc powder contained 500 ppm each of bismuth (Bi), Indium (In) and lead (Pb), the other zinc powder contained 500 ppm of lead (Pb).

Results of the measurement are shown in below Table 2 (in the case of electrolytic solution A) and Table 3 (in the case of electrolytic solution B). As to the amount of generated hydrogen gas in Tables is an average amount per one gram of zinc as the negative electrode active material per one day. The term of the measurement was seven days.

TABLE 2

| Amount of Generated Hydrogen Gas in Case of Electrolytic Solution A (µl/g-day) | | | | |
|---|---|---|---|---|
| Zinc Powder | i) $Bi_2O_3$ Addition | ii) $In_2O_3$ Addition | iii) $Bi_2O_3$ and $In_2O_3$ Addition | iv) No Addition |
| Bi, In and Pb (500 ppm each) | 1.5 | 1.9 | 1.3 | 2.0 |
| Pb (500 ppm) | 2.5 | 3.3 | 2.2 | 3.5 |

TABLE 3

| Amount of Generated Hydrogen Gas in Case of Electrolytic Solution B (µl/g-day) | | | | |
|---|---|---|---|---|
| Zinc Power | i) $Bi_2O_3$ Addition | ii) $In_2O_3$ Addition | iii) $Bi_2O_3$ and $In_2O_3$ Addition | iv) No Addition |
| Bi, In and Pb (500 ppm each) | 2.0 | 4.0 | 1.5 | 4.5 |
| Pb (500 ppm) | 4.0 | 11.0 | 3.0 | 12.0 |

Electrolytic solution B contained more impurities than electrolytic solution A, as seen from Table 1, and the amount of the generated hydrogen gas was greater in electrolytic solution B than in electrolytic solution A as seen from Tables 2 and 3.

In addition, it is understood from Tables 2 and 3, especially Table 3 that the addition of the bismuth compound and/or the indium compound to the electrolytic solution suppresses the generation of hydrogen gas, and especially, the addition of the bismuth compound remarkably suppresses the hydrogen gas generation. Further, the combination of the indium compound with the bismuth compound provides improved the suppression of the hydrogen gas generation.

EXAMPLE 1

An alkaline cell of R6 type as shown in FIG. 1 was produced in which bismuth oxide ($Bi_2O_3$) was added in an electrolytic solution, and a sustaining discharge time under 10 Ω-discharge (end voltage: 0.9 V) and an amount of generated hydrogen gas when the cell was stored for 20 days at a temperature of 60° C. were measured. The results are shown in below Table 4.

Referring to FIG. 1, there is seen a positive electrode 1 composition comprising manganese dioxide as a positive electrode active material combined with flaky graphite and polyacrylic sodium. The composition was formed into a ring and positioned in a positive electrode can 2 having a terminal.

A separator 3, and a negative electrode composition 4 comprising zinc paste is also illustrated. The negative electrode composition was in the form of a paste prepared by dry-mixing 60 parts by weight of zinc powder (which was the same as used in Experiment 1) and 2 parts by weight of polyacrylic sodium to have a resultant mixture, then mixing the resultant mixture with 38 parts by weight of an electrolytic solution (which will be explained below) to have a final mixture, and then gelating the final mixture. The cell contained 3.5 g of zinc and 2 ml of the electrolytic solution.

A negative electrode collector 5, a sealing member 6 for an opening, a metallic washer 7, a resin washer 8, an insulation cap 9 a negative electrode terminal 10 and a resin sheath 11, completes the alkaline cell.

The electrolytic solution was an aqueous solution containing 35% by weight of potassium hydroxide which had been saturated with zinc oxide. When the electrolytic solution was prepared, each of the potassium hydroxide and zinc oxide used was of an industrial grade.

The amount of bismuth oxide added to the electrolytic solution was 5 ppm, 100 ppm, 1000 ppm and 1% by weight and 10% by weight based the zinc contained as the negative electrode active material. The bismuth oxide was the same as that used in Experiment 1. For comparison, a cell having the electrolytic solution which contained no bismuth oxide was also tested. The zinc powder contained 500 ppm each of Bi, In and Pb.

TABLE 4

| Amount of $Bi_2O_3$ Added | 10Ω-Sustaining Discharge Time (hours) | Amount of Hydrogen Gas Generated (ml) (60° C., 20 days) |
|---|---|---|
| 5 ppm | 17.0 | 0.15 |
| 50 ppm | 17.0 | 0.10 |
| 100 ppm | 17.0 | 0.08 |
| 1000 ppm | 16.8 | 0.18 |
| 1% by weight | 16.5 | 0.26 |
| 10% by weight | 16.0 | 1.00 |
| No Addition | 17.0 | 0.30 |

As seen from Table 4, the addition of bismuth oxide ($Bi_2O_3$) of in a range of 5 ppm to 1% by weight, and especially in a range of 50 ppm to 1000 ppm suppresses the hydrogen gas generation. In addition, this specific range of the addition does not adversely affect discharge properties of the cell including the sustaining discharge time, and provides no problem for the practical application. It is contemplated that when the amount of bismuth oxide added is increased too much, surface of zinc powder is covered with bismuth, and further, in the course of the covering, zinc reacts too rapidly, so that the suppression with bismuth oxide is adversely affected.

EXAMPLE 2

Example 1 was repeated except that each of $Bi_2O_3$ and $In_2O_3$ was used in a content of 5 ppm, 100 ppm, 1000 ppm and 1% by weight and 10% by weight in place of merely $Bi_2O_3$. Indium oxide was the same as used in Experiment 1. The results of the measurement of the 10 Ω-sustaining discharge time and the amount of the generated hydrogen gas are shown in below Table 5.

TABLE 5

| Each Amount of $Bi_2O_3$ and $In_2O_3$ Added | Sustaining Discharge Time (hours) | Amount of Hydrogen Gas Generated (ml) [60° C., 20 days] |
|---|---|---|
| 5 ppm | 17.0 | 0.13 |
| 50 ppm | 17.0 | 0.09 |
| 100 ppm | 17.0 | 0.06 |
| 1000 ppm | 16.8 | 0.12 |
| 1% by weight | 16.5 | 0.23 |
| 10% by weight | 16.0 | 1.50 |
| No Addition | 17.0 | 0.30 |

As seen from Table 5, the addition of bismuth oxide and indium oxide each in a range of 5 ppm to 1% by weight relative to zinc, and especially in a range of 50 ppm to 1000 ppm suppresses the hydrogen gas generation. In addition, this specific range of the addition does not adversely affect the discharge properties, and provides no problem for the practical application.

As describe above, the addition of the bismuth compound and the optional indium compound suppresses the hydrogen gas generation due to the impurities contained in the cell.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mercury-free alkaline cell comprising a positive electrode composition, a negative electrode composition and an electrolytic solution comprising zinc powder as a negative electrode active material and a dispersed bismuth compound in an amount expressed as bismuth oxide in a range of from 5 ppm to 1% by weight relative to said zinc powder, whereby dissolved bismuth ion exchanges with zinc of said zinc powder, such that said bismuth deposits only on outside surfaces of said zinc powder.

2. The alkaline cell according to claim 1, wherein said electrolytic solution further includes an indium compound.

3. The alkaline cell according to claim 1, wherein said bismuth compound is present in an amount expressed as bismuth oxide in a range of from 50 ppm to 1000 ppm by weight relative to said zinc powder.

4. The alkaline cell according to claim 2, wherein said indium compound is present in said electrolytic solution in an amount expressed as indium oxide in a range of from 5 ppm to 1% by weight relative to said zinc powder.

* * * * *